Figure 1:
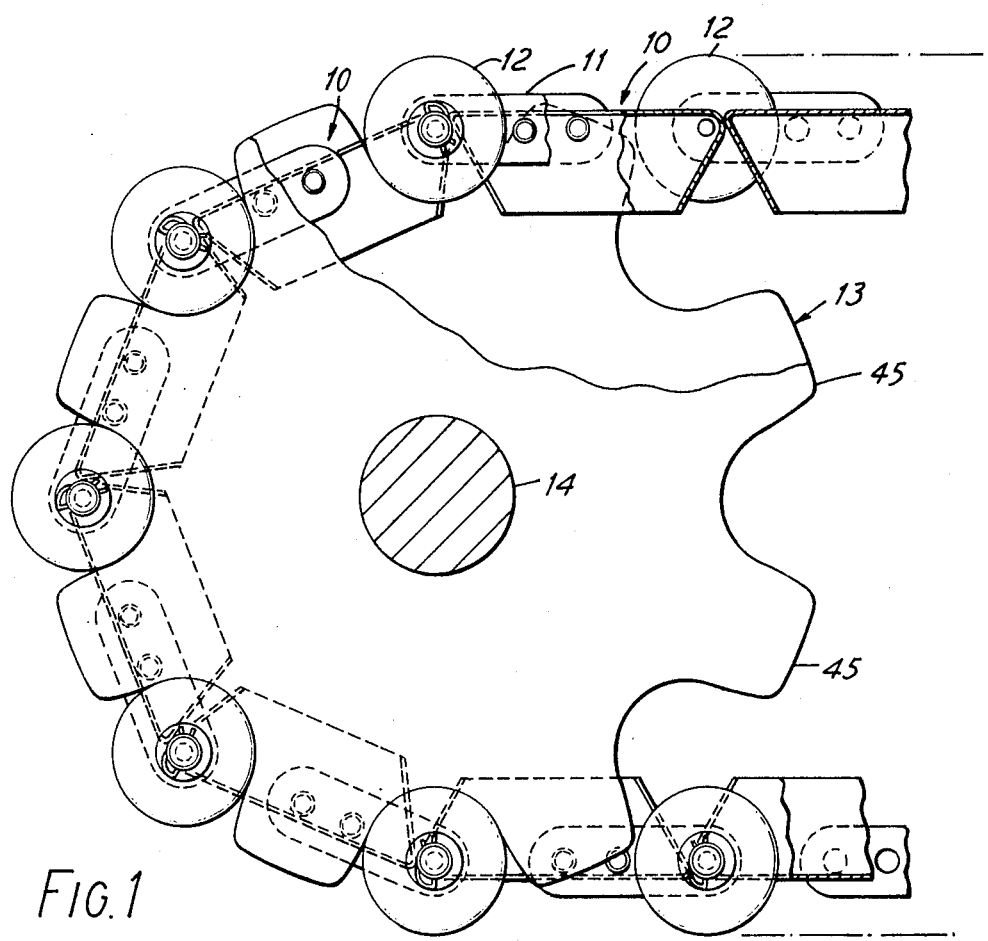

United States Patent [19]

Shaw

[11] Patent Number: 4,770,291

[45] Date of Patent: Sep. 13, 1988

[54] SLAT CONVEYOR

[75] Inventor: David W. Shaw, Martock, England

[73] Assignee: Alfa-Laval Cheese Systems Limited, Somerset, England

[21] Appl. No.: 13,027

[22] Filed: Feb. 10, 1987

[30] Foreign Application Priority Data

Feb. 12, 1986 [GB] United Kingdom ............... 8603408

[51] Int. Cl.⁴ .............................................. B65G 17/34
[52] U.S. Cl. .................................... 198/851; 198/822; 198/845
[58] Field of Search ................. 198/803.15, 822, 827, 198/828, 834, 835, 838, 845, 849, 850, 851; 474/218, 219, 220, 221, 224, 227, 228

[56] References Cited

U.S. PATENT DOCUMENTS

| | | | |
|---|---|---|---|
| 2,329,687 | 9/1943 | Becker | 198/851 |
| 3,123,202 | 3/1964 | Stevens | 198/845 X |
| 3,191,757 | 6/1965 | Parkes et al. | 198/851 |
| 3,194,388 | 7/1965 | Wulff | 198/845 |
| 3,312,334 | 4/1967 | Parkes | 198/851 |
| 3,981,389 | 9/1976 | Babunovic et al. | 198/803.15 |
| 4,155,444 | 5/1979 | Kovats | 198/822 |
| 4,418,817 | 12/1983 | Martin et al. | 198/851 X |
| 4,526,271 | 7/1985 | Finnighan | 198/851 X |
| 4,542,821 | 9/1985 | Livermore | 198/851 X |

FOREIGN PATENT DOCUMENTS

| | | | |
|---|---|---|---|
| 0098010 | 7/1980 | Japan | 198/851 |
| 2046202 | 11/1980 | United Kingdom | 198/851 |

Primary Examiner—Robert J. Spar
Assistant Examiner—Lyle Kimms
Attorney, Agent, or Firm—Davis Hoxie Faithfull & Hapgood

[57] ABSTRACT

A slat conveyor comprises a plurality of transverse slat units interconnected by links at the sides of the conveyor to form an endless chain-like structure mounted on sprockets at the ends of the conveyor, the slat units being fitted with rollers which roll along endless tracks. Each slat unit comprises a thin elongated plate having the longitudinal margins bent through an angle in excess of 90° to form an inverted channel-shaped slat member and two side plates secured one in each side of the slat member. Each side plate is fitted with two locating studs and an axle spindle. Each slat unit is connected to an adjacent slat unit by two of the links arranged one on each side of the conveyor, each link having two bores which receive the studs on the associated side of one slat unit as a close fit and a third bore which receives the axle shaft on the associated side of the adjacent slat unit as a rotational fit. The rollers are mounted on the axle shafts, and the links and rollers held in place by detachable pins on the axle spindles.

6 Claims, 3 Drawing Sheets

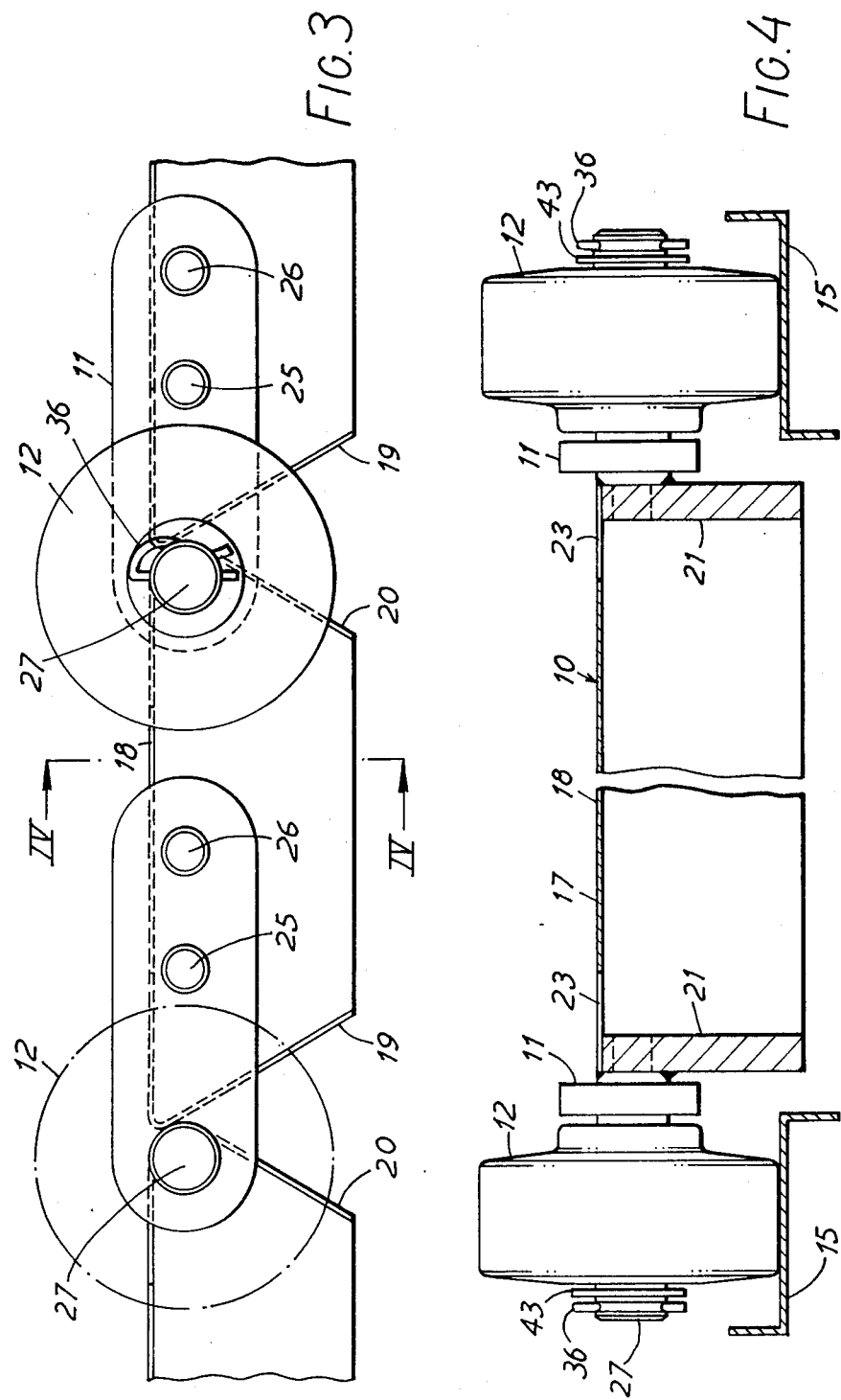

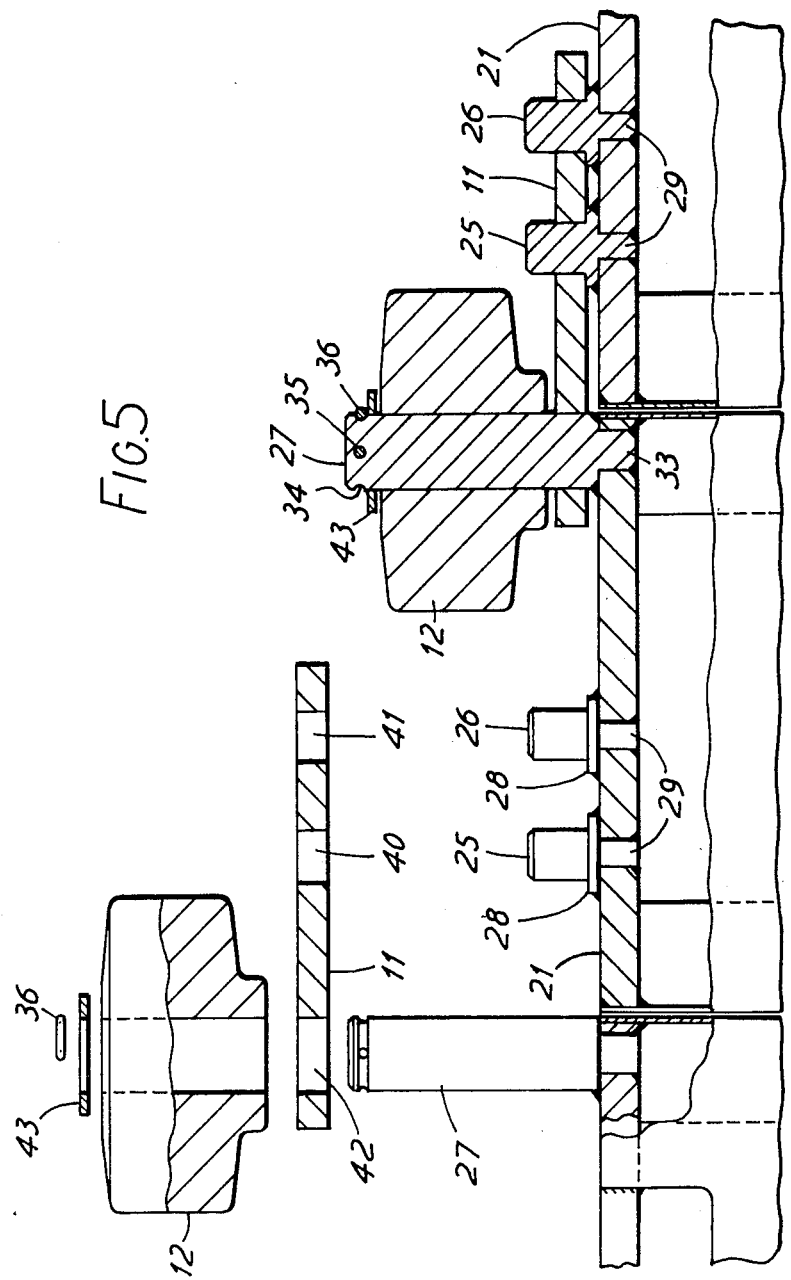

SLAT CONVEYOR

This invention relates to slat conveyors, and is concerned more particularly but not exclusively to slat conveyors suitable for handling cheese curd in mechanised installations.

The object of the invention is to provide an improved construction of slat conveyor which can readily be assembled and dismantled for cleaning purposes.

According to the invention there is provided a slat conveyor comprising a frame having guide means providing an endless track, a plurality of slat units, and links interconnecting adjacent slat units to form an endless chain-like structure which is mounted on said guide means for movement along the endless track, wherein each link has two end portions, one of said end portions being connected to one slat unit by first coupling means which prevent pivotal movement between the link and said one slat unit, and the other of said end portions of the link being connected to another slat unit adjacent said one slat unit by second coupling means which permit pivotal movement between the link and the other slat unit about a pivot axis, each link being detachable from said first and second coupling means to permit removal of a slat unit from the chain-like structure.

A slat conveyor in accordance with the invention may be constructed so that it can be assembled and dismantled from the sides thereof without the need to provide access from above or below. The conveyor is thus particularly suitable for use in mechanical handling installations in which the conveyors are superimposed one above another, such as for example in the cheese making installation described and illustrated in U.S. Pat. No. 4,309,941.

The first coupling means may comprise two locating studs each mounted on the associated slat unit or on the link and each engaged as a close fit in a separate bore in the link or slat unit respectively, and the second coupling means may comprise an axle spindle mounted on the associated slat unit or on the link and engaged as a close rotational fit in a bore in the link or slat unit respectively. The locating studs and the axis spindles are preferably mounted on the slat units and engaged in bores in the links. The links can conveniently be held on the locating studs and the axle spindles by detachable pins on the axially outer ends of the axle spindles.

In a slat conveyor according to the invention in which the slat units extend transversely across the conveyor and each pair of adjacent slat units interconnected by a link have two opposing surfaces on the two slat units respectively which are in contact or spaced close to one another, the opposing surface on the slat unit connected to the link by the second coupling means is preferably part-cylindrical with a radial centre which is co-axial with the pivot axis of the link on the slat unit, whereby the distance between the opposing surfaces remains constant during pivotal movement of the two slat units relative to one another.

In a preferred construction of a slat conveyor according to this aspect of the invention, each slat unit comprises a thin elongated plate having the longitudinal margins thereof bent through an angle in excess of 90° to form an inverted channel shaped slat member having a substantially flat centre section and two transverse skirts forming the leading and trailing ends of the slat member in one direction of movement along the track, the junction between the centre section and the transverse skirt at the end of the slat unit connected to a link by the second coupling means being formed with the part-cylindrical opposing surface.

In this construction of slat conveyor, each slat unit may include two side plates secured one in each side of the inverted channel shaped slat member, each side plate being fitted with two locating studs engaged as a close fit in separate bores in one of the links and with an axle spindle engaged as a close rotational fit in a bore in another of the links, the locating studs and the axle spindle being parallel to one another and projecting laterally outwards from the slat unit.

In a slay conveyor according to the invention each slat unit is preferably fitted with rollers, and the guide means preferably comprise sprockets at the end of the conveyor and guide rails between the sprockets, the rollers being adapted to roll along the guide rails to support the upper flight of the conveyor and the sprockets having teeth engageable with the rollers. The rollers can conveniently be mounted on the axle spindles. The links and rollers can conveniently be held on the locating studs and the axle spindles by detachable pins on the axle spindles.

Figure 2:
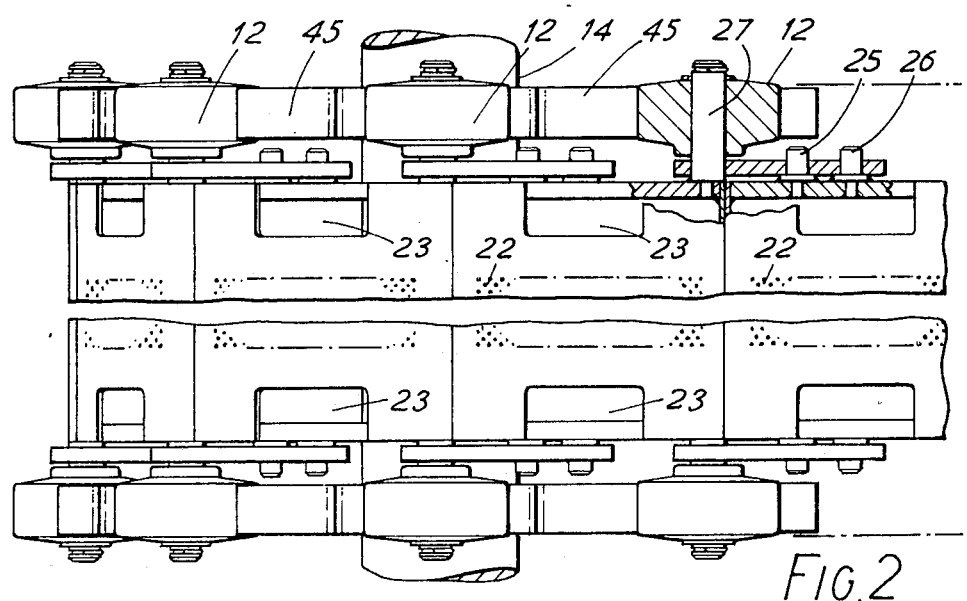

One construction of a slat conveyor according to the invention will now be described, by way of example, with reference to the accompanying drawings, in which:

FIG. 1 is a side elevation of one end of the conveyor, partially cut-away to show details of the construction, FIG. 2 is a plan of the end of the conveyor shown in FIG. 1, with the centre portion and part of one side cut away, FIG. 3 is a side elevation, on a larger scale, of part of the conveyor with one of the rollers removed, FIG. 4 is a transverse sectional elevation of one of the slat units of the conveyor, taken along the line IV—IV in FIG. 3 with the centre portion of the slat unit cut away, and FIG. 5 is a part-sectional plan of a part of one side of the conveyor, with one roller and its associated link in exploded view.

The slat conveyor shown in the drawings comprises a plurality of transverse slat units 10 interconnected by links 11 at the sides of the conveyor to form an endless chain-like structure which is fitted with rollers 12 and mounted on sprockets 13 secured on transverse shafts 14 arranged one at each end of the conveyor. The shafts 14, only one of which is shown in the drawings, are rotatably mounted on a frame (not shown). The upper and lower flights of the chain-like structure are supported by the rollers 12 which run along guide rails 15 mounted on the frame (only the two guide rails for the upper flight are shown in FIG. 4 of the drawings).

Each slat unit 10 comprises a thin elongated metal plate having the longitudinal margins thereof bent through an angle in excess of 90° to form an inverted channel-shaped slat member 17 having a substantially flat centre section 18 and transverse skirts 19, 20. As shown in FIG. 3, the junction between the centre section 18 and the skirt 19 has a small radius of curvature, but the junction between the centre section 18 and the skirt 20 has a part-cylindrical surface with a relatively large radius of curvature. Each slat unit 10 also comprises two relatively thick side plates 21 mounted one in each side of the channel-shaped slat member 17, the two side plates 21 being perpendicular to the centre section 18 and skirts 19, 20 of the slat member, and each side plate 21 having a shape corresponding to the internal cross section of the slat member and being welded at its periphery to the inside surfaces of the slat member. The centre section 18 of the slat member may be perforated as shown at 22 in FIG. 2, except for the side portions thereof, for drainage purposes. The side portions of the centre section 18 of the slat member are cut away and co-operate with the side plates 21 to provide two large drainage openings 23, one at each side of the slat member.

Each side plate 21 is fitted on the outer surface thereof with two locating studs 25, 26 and an axle spindle 27, the two studs and the spindle projecting perpendicularly outwards away from the side plate 21. The spindle 27 is secured to the top corner portion of the plate 21 adjacent the large radius junction between the centre section 18 and the transverse skirt 20 of the slat member 17, and the two locating studs are spaced apart from the spindle 27. Each of the locating studs 25, 26 is provided at the axially inner end thereof with a flange 28 which abuts the outer surface of the side plate 21 and with a small diameter stem 29 which is engaged as a close fit in a bore in the side plate 21, the stem and flange being welded to the plate 21. The spindle 27 is provided at its axially inner end with a small diameter stem 33 which is engaged as a close fit in a bore in the plate 21, the annular shoulder between the stem and the spindle abutting against the outer surface of the plate 21, and the stem and spindle being welded to the plate 21. The spindle is cylindrical with a radius equal to the radius of the part-cylindrical surface of the junction between the centre section 18 and the skirt 20 of the slat member 17, and the spindle is positioned so that its cylindrical surface is flush with the part-cylindrical surface of the junction. The axis of the spindle is thus co-axial with the radial axis of the part-cylindrical surface of the above mentioned junction. The axially outer end of the spindle 27 is provided with an annular groove 34 and a transverse bore 35 opening into the groove for reception of a hitch pin 36 (FIG. 3).

Each slat unit 10 is connected to an adjacent slat unit by two of the links 11 arranged one at each side of the slat unit. Each link 11 comprises a metal bar formed with three bores 40, 41, 42 (FIG. 5) spaced apart along the longitudinal axis of the link, the bores 40, 41 receiving the locating studs 25, 26 on the associated side of the slat unit as a close fit and the bore 42 receiving the axle spindle 27 on the associated side of the adjacent slat unit as a close rotational fit. A roller 12 and an annular washer 43 are mounted on the axle spindle 27, and the link 11, roller 12, and washer 43 are held on the axle spindle by the hitch pin 36. The spacing between the bores on each link is such that the transverse skirt 19 on each slat unit is in line contact with or spaced very close to the part-cylindrical surface of the junction between the centre section 18 and the skirt 20 on the adjacent slat unit. The distance between the groove 34 in the axial outer end of the spindle 27 and the outer surface of the associated slide plate 21 is greater than the aggregate of the widths of the link 11, roller 12 and washer 43 so as to provide clearance which permits a small degree of movement of the links 11 axially on the studs 25, 26 and spindle 27 and also a small degree of movement of the rollers 12 along the spindles 27. This freedom of movement facilitates cleaning by providing access to the parts of the studs 25, 26 and axle spindles 27 between the side plates, links and rollers.

Each hitch pin 36 has two limbs connected by a bight portion, one limb being straight and engaged in the bore 35 of the associated spindle 27 and the other limb having a curved portion adapted to engage as a snap fit in the annular groove 34 in the spindle 27 when the straight limb is inserted in the bore. The bight portion forms a handle which facilitates withdrawal of the hitch pin to permit removal of the rollers 12 and the links 11 from the spindle 27 and the studs 25, 26 when it is necessary to remove a slat unit.

Each of the transverse shafts 14 at the ends of the conveyor is fitted with two sprockets 13, each sprocket having teeth 45 which engage between the rollers 12. The drive force for the conveyor is transmitted from the sprockets at the front end of the conveyor through the rollers 12, axle spindles 27, side plates 21 and the links 11. As explained above, the upper and lower flights of the conveyor between the sprockets are supported by the rollers 12 which run on the guide rails 15.

In the slat conveyor shown in the drawings, each slat unit can readily be removed for cleaning or replacement by removing the hitch pins 36 on the spindles suppporting the links 11 connecting the slat unit to the adjacent slat unit, withdrawing the two links together with their associated rollers 12 from the axle spindles 27 and the locating studs 25, 26, and then withdrawing the slat unit. Each slat unit can thus be removed or replaced without providing access from above or below.

The slat conveyor has the further advantage that each slat unit remains in line contact with or closely spaced to the adjacent slat unit during movement of the chain-like structure of slat units along the endless path of the conveyor, including movement around the sprockets, due to the fact that each axle spindle is co-axial with the radial axis of the part-cylindrical surface at the leading end of the slat unit.

I claim:

1. A slat conveyor comprising a plurality of transverse slat units and links interconnecting the slat units to form an endless chain-like structure, a frame and sprockets on said frame, said chain-like structure being mounted on said sprockets, each slat being connected to an adjacent slat by two links arranged one on each side of the chain-like structure, first coupling means connecting each of said links to one of the slat units, said first coupling means preventing pivotal movement between the link and said one slat unit, and second coupling means connecting each of said links to an adjacent slat unit, said second coupling means permitting pivotal movement between the link and said adjacent slat unit, the links on each side of the chain-link structure being spaced longitudinally from one another, and each link being detachable from said first and second coupling means to permit removal of a slat unit together with its associated links from the chain-like structure without disturbing the remaining links.

2. A slat conveyor as claimed in claim 1, wherein said first coupling means comprises two locating studs each mounted on one of the two interconnected components consisting of the link and said one slat unit, the other component having a bore which receives the stud as a close fit, and said second coupling means comprises an axle spindle mounted on one of the two interconnected components consisting of the link and said other slat unit, the other of the last mentioned interconnected components having a bore which receives the axle spindle as a close rotational fit.

3. A slat conveyor as claimed in claim 2, wherein the two locating studs are mounted on said one slat unit, the axle spindle is mounted on said other slat unit, and the link is provided with said bores which receive the studs and axle spindle as close fits.

4. A slat conveyor comprising a plurality of transverse slat units, links interconnecting the slat units to form an endless chain-like structure, a frame and sprockets on said frame, said chain-like structure being mounted on said sprockets to provide an upper flight and a lower return flight of the chainlike structure, first coupling means connecting each link to one slat unit, said first coupling means preventing pivotal movement between the link and said one slat unit and second coupling means also connecting each link to another slat unit adjacent said one slat unit, said second coupling means permitting pivotal movement between the link and the other slat unit, each slat unit comprising a thin elongated plate having the longitudinal margins thereof bent through an angle in excess of 90° to form in said upper flight an inverted channel-shaped slat member having a substantially flat center section and two transverse skirts forming leading and trailing ends of the slat in one direction of movement of the chain-like structure, and two side plates secured one in each side of the inverted channel-shaped slat member, each side plate being fitted with two locating studs and an axle spindle which are parallel to one another and project laterally outwards from the side plate, each link being provided with two locating bores which receive as a close fit the two locating studs on a side plate of one slat unit and with an axle bore which receives as a close rotational fit the axle spindle on a side plate of a slat unit adjacent said one slat unit, said locating studs forming said first coupling means for the link, the axle spindle forming said second coupling means for the link, and each link being detachable from the locating studs and axle spindle to permit removal of a slat unit from the chain-like structure.

5. A slat conveyor as claimed in claim, 4, wherein each slat unit is fitted with rollers mounted on the axle spindles, and the frame is provided with guide rails between the sprockets, the rollers being adapted to roll along the guide rails to support the upper flight of the chain-like structure and the sprockets having teeth engageable with said rollers.

6. A slat conveyor as claimed in claim 5, wherein the links and rollers are held on the locating studs and the axle spindles by detachable pins on the axially outer ends of the axle spindles, and clearance is provided between the side plates, the links and the rollers to provide access to the studs and spindles for cleaning purposes.

* * * * *